United States Patent
Liao

(10) Patent No.: US 9,432,960 B2
(45) Date of Patent: Aug. 30, 2016

(54) METHOD OF HANDLING PROXIMITY SERVICE IN WIRELESS COMMUNICATION SYSTEM

(71) Applicant: HTC Corporation, Taoyuan County (TW)

(72) Inventor: Ching-Yu Liao, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 41 days.

(21) Appl. No.: 14/150,732

(22) Filed: Jan. 8, 2014

(65) Prior Publication Data

US 2014/0192739 A1 Jul. 10, 2014

Related U.S. Application Data

(60) Provisional application No. 61/749,928, filed on Jan. 8, 2013.

(51) Int. Cl.
| | | |
|---|---|---|
| *H04W 8/22* | (2009.01) | |
| *H04W 60/04* | (2009.01) | |
| *H04W 4/02* | (2009.01) | |
| *H04W 8/00* | (2009.01) | |
| *H04W 48/12* | (2009.01) | |
| *H04L 29/08* | (2006.01) | |

(52) U.S. Cl.
CPC ............ *H04W 60/04* (2013.01); *H04W 4/023* (2013.01); *H04W 8/22* (2013.01); *H04L 67/16* (2013.01); *H04W 8/005* (2013.01); *H04W 48/12* (2013.01)

(58) Field of Classification Search
USPC ......................................................... 370/329
See application file for complete search history.

(56) References Cited

U.S. PATENT DOCUMENTS

| | | | |
|---|---|---|---|
| 2009/0287827 A1 | 11/2009 | Horn | |
| 2011/0098043 A1 | 4/2011 | Yu | |
| 2012/0011247 A1 | 1/2012 | Mallik | |
| 2012/0218889 A1* | 8/2012 | Watfa et al. | ............... 370/230 |
| 2014/0066058 A1* | 3/2014 | Yu et al. | ..................... 455/434 |
| 2014/0092885 A1* | 4/2014 | Venkatachalam ... H04W 76/023 |
| | | | 370/338 |
| 2014/0162685 A1* | 6/2014 | Edge | ..................... 455/456.1 |

FOREIGN PATENT DOCUMENTS

| | | |
|---|---|---|
| WO | 2012114160 A1 | 8/2012 |
| WO | 2014031713 A1 | 2/2014 |
| WO | 2014044326 A2 | 3/2014 |

OTHER PUBLICATIONS

European patent application No. 14020001.5, European application filing date: Jan. 8, 2014, European Search Report mailing date:Oct. 7, 2014.

(Continued)

*Primary Examiner* — Omar Ghowrwal
*Assistant Examiner* — Angel Brockman
(74) *Attorney, Agent, or Firm* — Winston Hsu; Scott Margo

(57) ABSTRACT

A method of handling proximity service (ProSe) in a wireless communication system is disclosed. The method includes transmitting, by a mobile device of the wireless communication system, a request message to one of the plurality Mobility Management Entities (MMEs) of the wireless communication system, for requesting a proximity service (ProSe) service; and indicating, by the one of the plurality of MMEs, to the mobile device a ProSe capability of a system network of the wireless communication system in an accept message.

7 Claims, 15 Drawing Sheets

(56) References Cited

OTHER PUBLICATIONS

Office action mailed on Oct. 15, 2014 for the European application No. 14020001.5, filing date Jan. 8, 2014, p. 1-19.
3GPP TR 22.803 V1.1.0, Nov. 2012.
3GPP TS 23.401 V11.4.0, Dec. 2012.
3GPP TS 23.682 V11.3.0, Dec. 2012.
European patent application No. 14020001.5, European application filing date: Jan. 8, 2014, European Search Report mailing date: Jun. 4, 2014.
3GPP TR 22.803 V1.1.0 (Nov. 2012), "3rd Generation Partnership Project; Technical Specification Group SA; Feasibility Study for Proximity Services (ProSe); (Release 12)", XP050681691, pp. 1-39.

* cited by examiner

METHOD OF HANDLING PROXIMITY SERVICE IN WIRELESS COMMUNICATION SYSTEM

CROSS REFERENCE TO RELATED APPLICATIONS

This application claims the benefit of U.S. Provisional Application No. 61/749,928, filed on Jan. 8, 2013 and entitled "Methods of handling device to device communication", the content of which is incorporated herein.

BACKGROUND OF THE INVENTION

1. Field of the Invention

The application relates to a method utilized in a wireless communication system and communication device thereof, and more particularly, to a method of handling proximity service (ProSe) in the wireless communication system.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNEs) for communicating with multiple user equipments (UEs), and communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Conventionally, when two mobile devices (i.e. UE 102 and UE 104) in close proximity communicate with each other, a data path (user plane) thereof goes via the operator network. The typical data path for this type of communication is shown in FIG. 1, where base stations (i.e. eNB 102 and eNB 104) and/or at least one gateway 1000 (GWs) are involved for communication between UEs 102 and 104. If the UEs 102 and 104 are in proximity of each other, they may be able to use a local or direct path to perform proximity service (ProSe) Communication. For example, in the 3$^{rd}$ Generation Partnership Project (3GPP) Long Term Evolution (LTE) spectrum, the operator may move the data path (user plane) off the access and core networks onto direct links between the UEs 202 and 204. This direct data path is shown in FIG. 2 between the UEs 202 and 204. Additionally, another example is provided when the data path is locally routed via the eNB 3002, and the locally-routed data path is shown in FIG. 3 for illustrating the communication between the UEs 302 and 304.

For the ProSe Communication scenarios depicted in FIG. 2 and FIG. 3, several control path scenarios may be applied. The following paragraphs and figures provide examples of potential control paths for different situations, understanding that other groups are responsible for defining the specific control paths associated with ProSe. When the UEs 402 and 404 involved in the ProSe Communication are served by the same eNB and the network coverage is available, the system 40 may decide to perform ProSe Communication using control information exchanged between the UEs 402 and 404, the eNB 4002 and the Evolved Packet Core (EPC) 4000, such as processing session management, authorization and security, as shown by the solid arrows in FIG. 4. For charging, signalling modifications should be minimized with respect to the existing architecture. The UEs 402 and 404 may in addition exchange direct signalling to support the ProSe Communication path as shown by the dashed arrow in FIG. 4.

When the UEs involved in the ProSe Communication are served by different eNBs 5002 and 5004 (e.g., border cell, macro/micro cell) and network coverage is available, the system 50 may decide to perform ProSe Communication using control information exchanged between the UEs 502 and 504, the eNBs 5002 and 5004 and the EPC 5000, such as processing session management, authorization, security, as shown by the solid arrows in FIG. 5. In this configuration, the eNBs 5002 and 5004 may coordinate with each other through the EPC 5000 or communicate directly for radio resource management as shown by the dashed arrow in FIG. 5. For charging, signalling modifications should be minimized with respect to the existing architecture. The UEs 502 and 504 may in addition exchange direct signalling to support the ProSe Communication path as shown by the dashed arrow in FIG. 5.

If network coverage is available to a subset of the UEs 600 and 604, one or more Public Safety UEs may relay the radio resource management control information for other UEs 600 and 604 that do not have network coverage. In comparison, if network coverage is not available, the control path may be directly between Public Safety UEs 600 and 604, as shown with the solid line in FIG. 6. In this configuration, the Public Safety UEs 600 and 604 may rely on pre-configured radio resources to establish and maintain the ProSe Communication. Alternatively, a Public Safety Radio Resource Management Function, which may reside in a Public Safety UE, may manage the allocation of radio resources for Public Safety ProSe Communication as shown with the dashed lines in FIG. 6.

Please refer to FIG. 7, which illustrates a schematic diagram of a conventional location reporting procedure. As shown in FIG. 7, the location reporting procedure is used by an MME to request the eNB to report where the UE is currently located when the target UE is in ECM-CONNECTED state. The need for the eNB to continue reporting ceases when the UE transitions to ECM-IDLE. This procedure may be used for services that require accurate cell identification (e.g. for emergency services, lawful intercept, charging).

In detail, the location reporting procedure includes three steps shown in FIG. 7. In the first step, the MME sends a Location Reporting Control message to the eNB. The Location Reporting Control message shall identify the UE for which reports are requested, the requested location information and may contain information such as reporting type. Requested location information is TAI+EGCI (i.e. Tracking Area Identity+Evolved Global Cell Identity). Reporting type indicates whether the message is intended to trigger a single stand-alone report about the current Cell ID serving the UE or start the eNB to report whenever the UE changes cell. In the second step, the eNB sends a Location Report message informing the MME about the location of the UE which shall include the requested location information. In the third step, the MME can send a Cancel Location Reporting message to inform the eNB that it should terminate location reporting for a given UE. This message is needed only when the reporting was requested for a reporting period.

Moreover, there is a demonstration of the conventional location change reporting procedure. The Packet Data Network Gateway (PGW) may request for each Packet Data Network (PDN) connection independently by using the "MS Info Change ReportingAction" parameter whether the MME should report changes of ECGI/TAI and/or by using "CSG Information Reporting Action" parameter whether the MME should report changes of user CSG information to the PGW. The PGW may also request the MME to stop reporting ECGI/TAI and/or user CSG information changes. The MME should obey the last explicit instruction received from the PGW or source MME/S4-SGSN.

If ECGI/TAI and/or user CSG information are permitted to be sent to the PGW operator according to MME operator's policy, the MME should include an indication for the support of reporting changes in ECGI/TAI and/or user CSG information when signalling to the PGW during both mobility management and session management procedures. If the level of support changes during a mobility management procedure then the MME shall indicate the current level of support to the S-GW and shall in addition provide ECGI/TAI even if the PGW has not requested this information. This could for example happen during MME change when the level of support indicated by the old MME is not the same as in the new MME. The inclusion of ECGI/TAI may trigger a Modify Bearer Request message from S-GW to the PGW and therefore this may make sure that the new level of support reaches the PGW. Besides, The PGW shall not request the MME to report ECGI/TAI and/or user CSG information changes if it has not received the indication for support from the MME.

Please refer to FIG. 8, which illustrates a schematic diagram of a conventional notification for the ECGI and/or user CSG information changes. As shown in FIG. 8, step 1a indicates that if the ECGI of the UE changes, the MME receives the ECGI information Update from the eNB, and step 1b indicates that the MME detects that the user CSG information has changed by comparing with the MME stored user CSG information. Noticeably, step 1a and step 1b are independent, such that it is also possible that these two changes are triggered at same time. Step 2 indicates that if the MME has been requested to report the ECGI and/or user CSG information changes to the PGW for the UE, the MME should send the Change Notification message to the SGW indicating the new ECGI and/or user CSG information. The MME stores the notified user CSG information. Step 3 indicates that The SGW forwards the Change Notification message to the PGW. If dynamic PCC is deployed, and ECGI changes need to be conveyed to the PCRF, then the PGW should send this information to the PCRF. Step 4 indicates that the PGW sends the Change Notification Ack to the SGW, and step 5 indicates that the SGW forwards the Change Notification Ack to the MME.

Furthermore, there is a demonstration of the external identifier. A subscription used for MTC has one IMSI and may have one or several External Identifier (s) that are stored in the HSS. External Identifier should be globally unique, and includes the Domain Identifier and the Local Identifier. The Domain Identifier identifies a domain that is under the control of a Mobile Network Operator (MNO), and is used to identify where services provided by the operator network can be accessed (e.g. MTC-IWF provided services). An operator may use different domain identifiers to provide access to different services. Additionally, the Local Identifier is used to derive or obtain the IMSI, should be unique within the applicable domain, and is managed by the Mobile Network Operator.

Although the conventional communication has provides the ProSe communication in an Evolved Packet System (EPS) comprising the mobile device (UE), the base station (eNB) and network entities supporting the ProSe feature, it is not clear how the EPS determines the feasibility of the ProSe communication for the UE. Also, when initial deployment of the ProSe in the EPS, it is possible that the some network entities in the EPS do not support a ProSe feature, i.e. homogeneously support of the ProSe feature in the EPS is not feasible, such that it is unknown how the network handles such scenario. What's more, it is not clear how a ProSe-enabled UE discovers an interested UE/group in the proximity and how the UE initiates the ProSe communication with another UE.

Therefore, it is important to provide another method of handling device to device communication, so as to provide another proximity service in a wireless communication system.

SUMMARY OF THE INVENTION

A method of handling proximity service (ProSe) in a wireless communication system is provided.

In one embodiment, a method of handling ProSe in a wireless communication system comprises: receiving, by a network entity of the wireless communication system, an attach request message or tracking area update (TAU) request message from a mobile device of the wireless communication system; and indicating, by the network entity, to the mobile device whether the network entity supports a ProSe capability in an attach accept message or TAU accept message.

In another embodiment, a method of handling ProSe in a wireless communication system comprises: receiving, by a mobile device of the wireless communication system, a system information from at least one base station of the wireless communication system, wherein the system information indicates whether the base station supports a ProSe capability; and selecting or reselecting, by the mobile device, a cell associated to the base station which supports the ProSe capability, wherein the mobile device is ProSe-enabled.

In another embodiment, a method of handling ProSe in a wireless communication system comprises: receiving, by a ProSe application server, an application user registration request from a ProSe application client in a ProSe-enabled mobile device, wherein the application user registration request comprises at least an application user identifier (ID) and an authentication information; and determining, by the ProSe application server, whether the application user registration is successful by checking whether the application user ID is subscribed for the ProSe service and the authentication information is valid.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
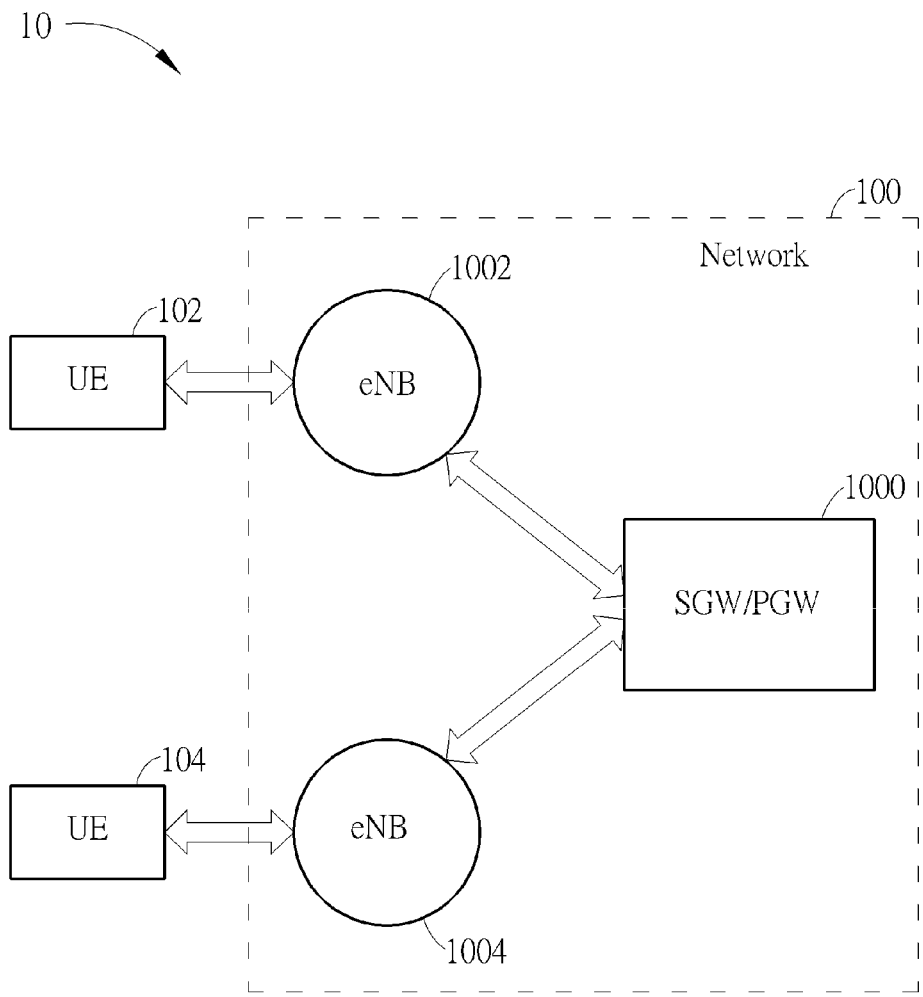
FIG. 1 to FIG. 6 are conventional schematic diagrams for the proximity communication.
Figure 2:
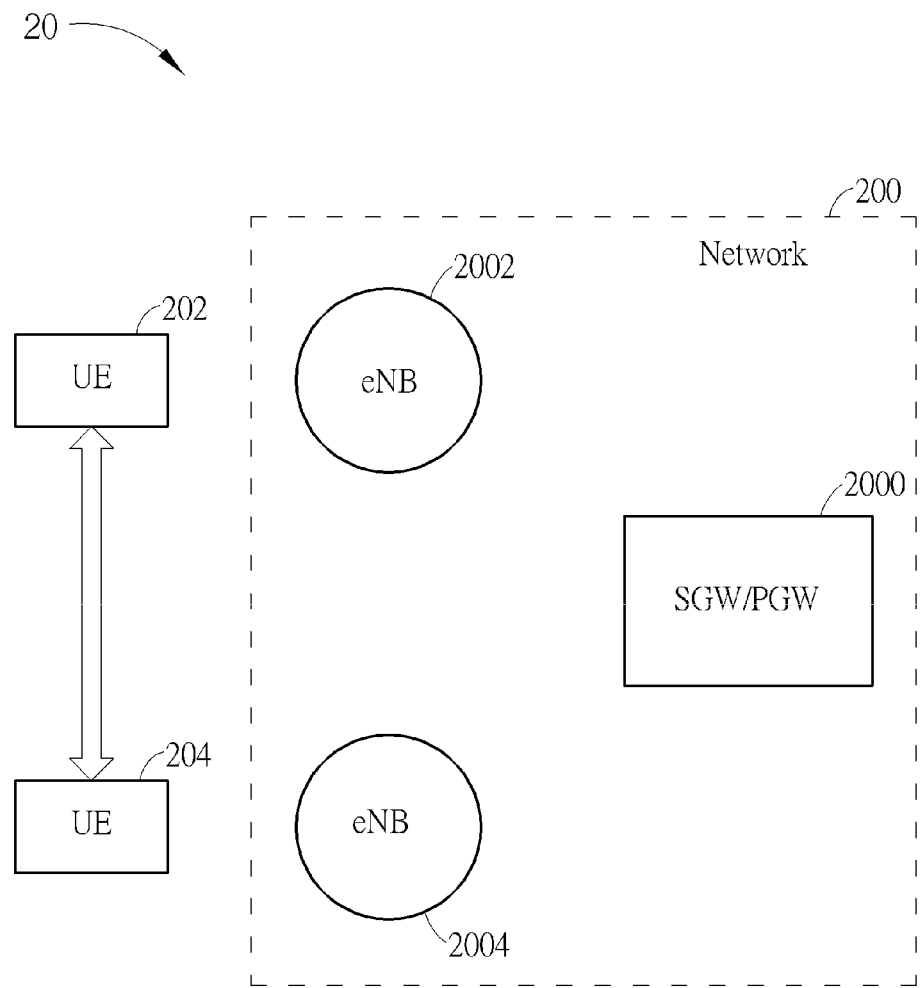
Figure 3:
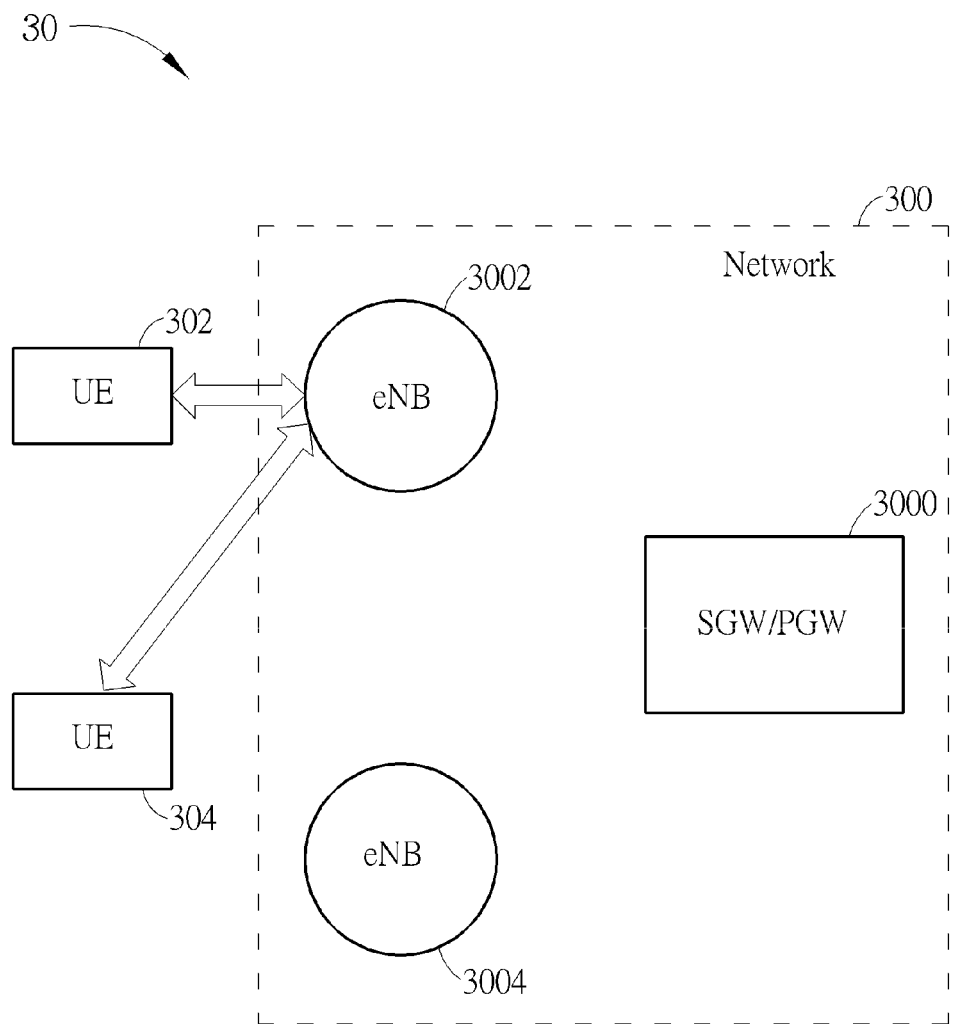
Figure 4:
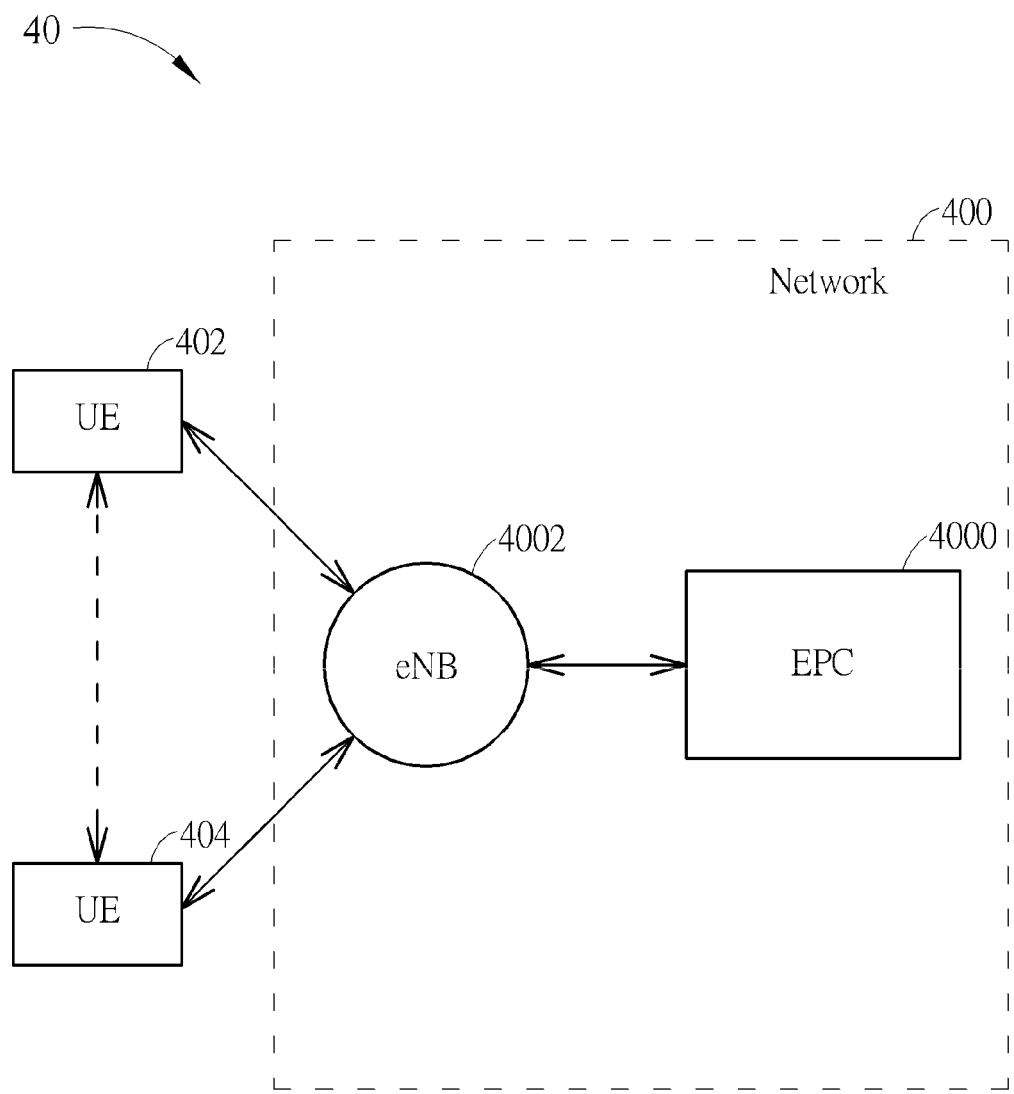
Figure 5:
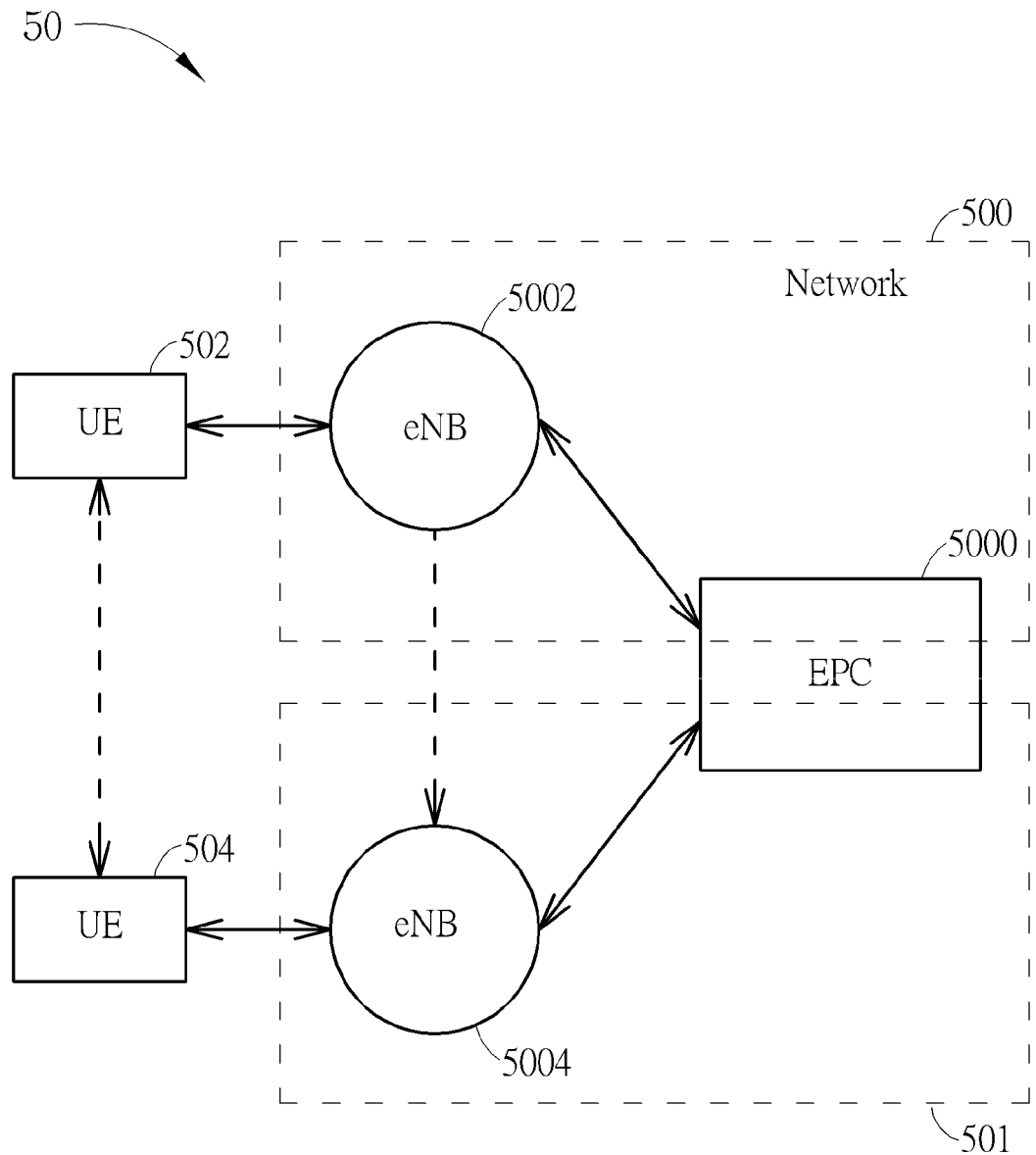
Figure 6:
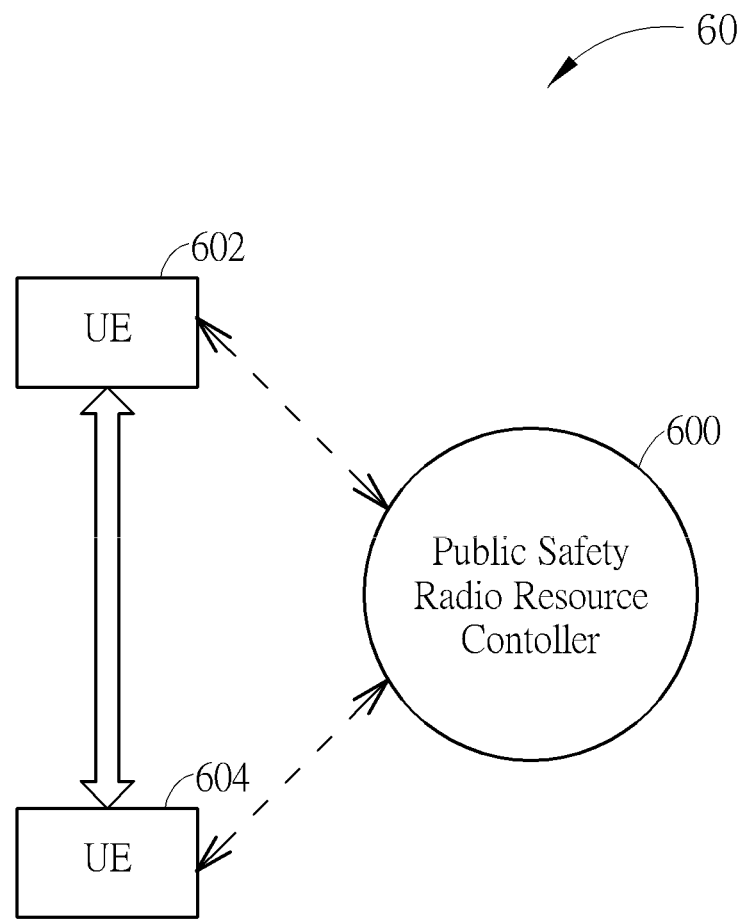
Figure 7:
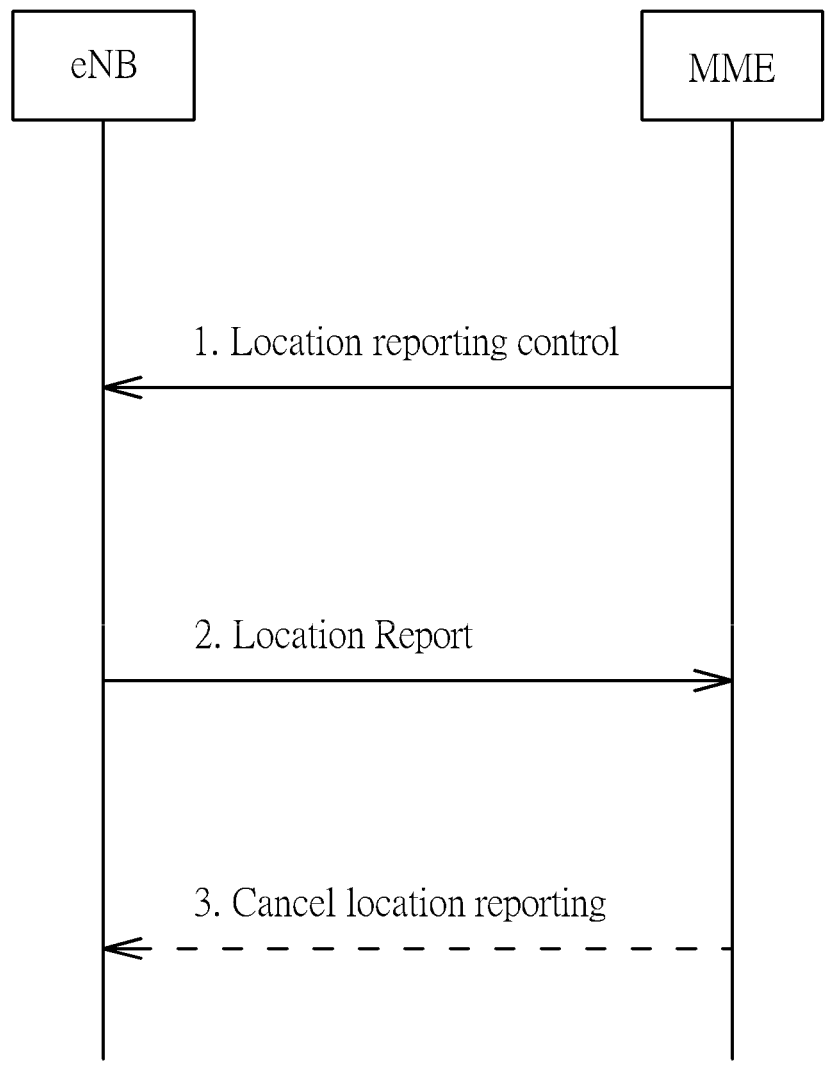
FIG. 7 is a schematic diagram of a conventional location reporting procedure.
Figure 8:
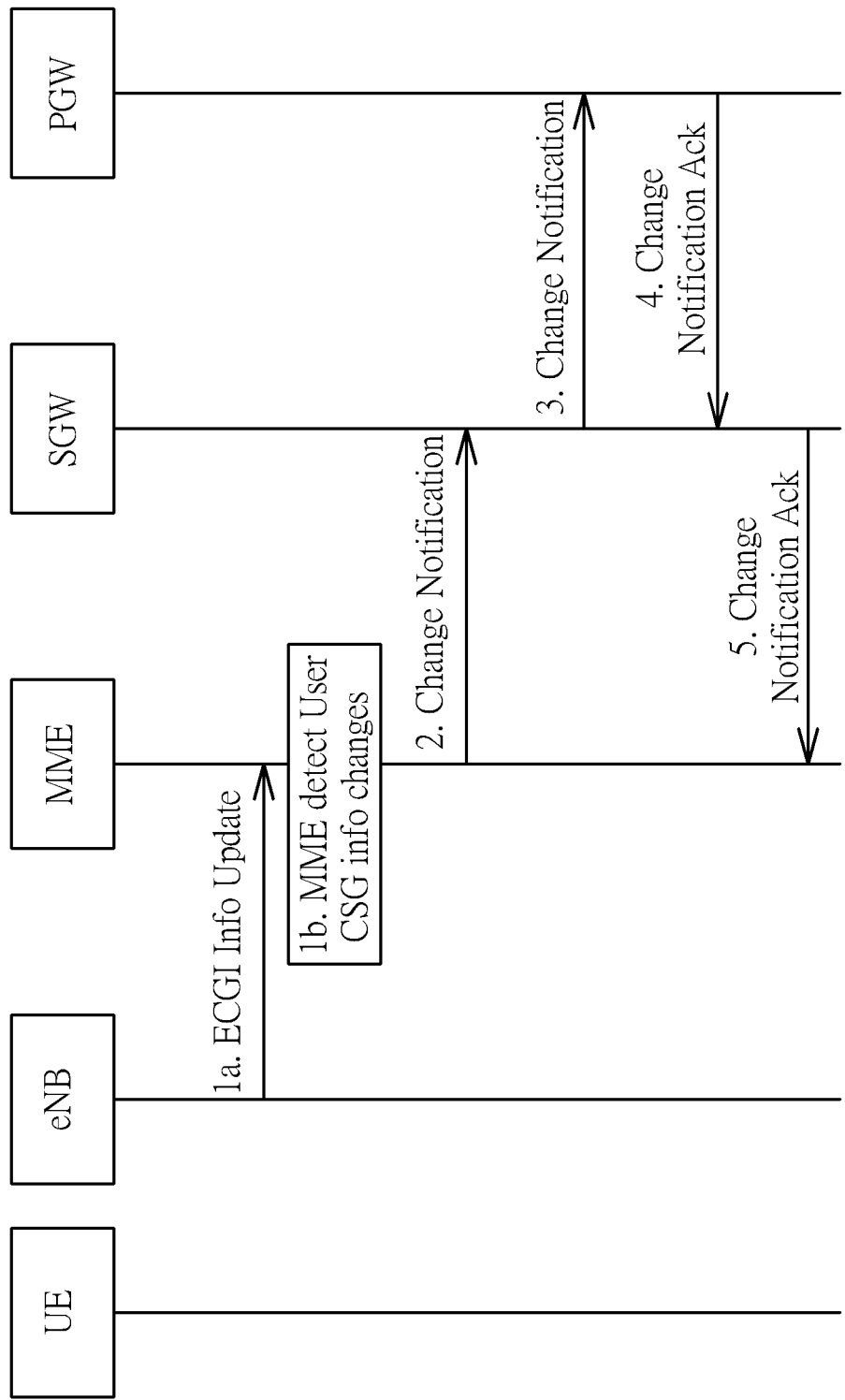
FIG. 8 is a schematic diagram of a conventional notification for the ECGI and/or user CSG information changes.
Figure 9:
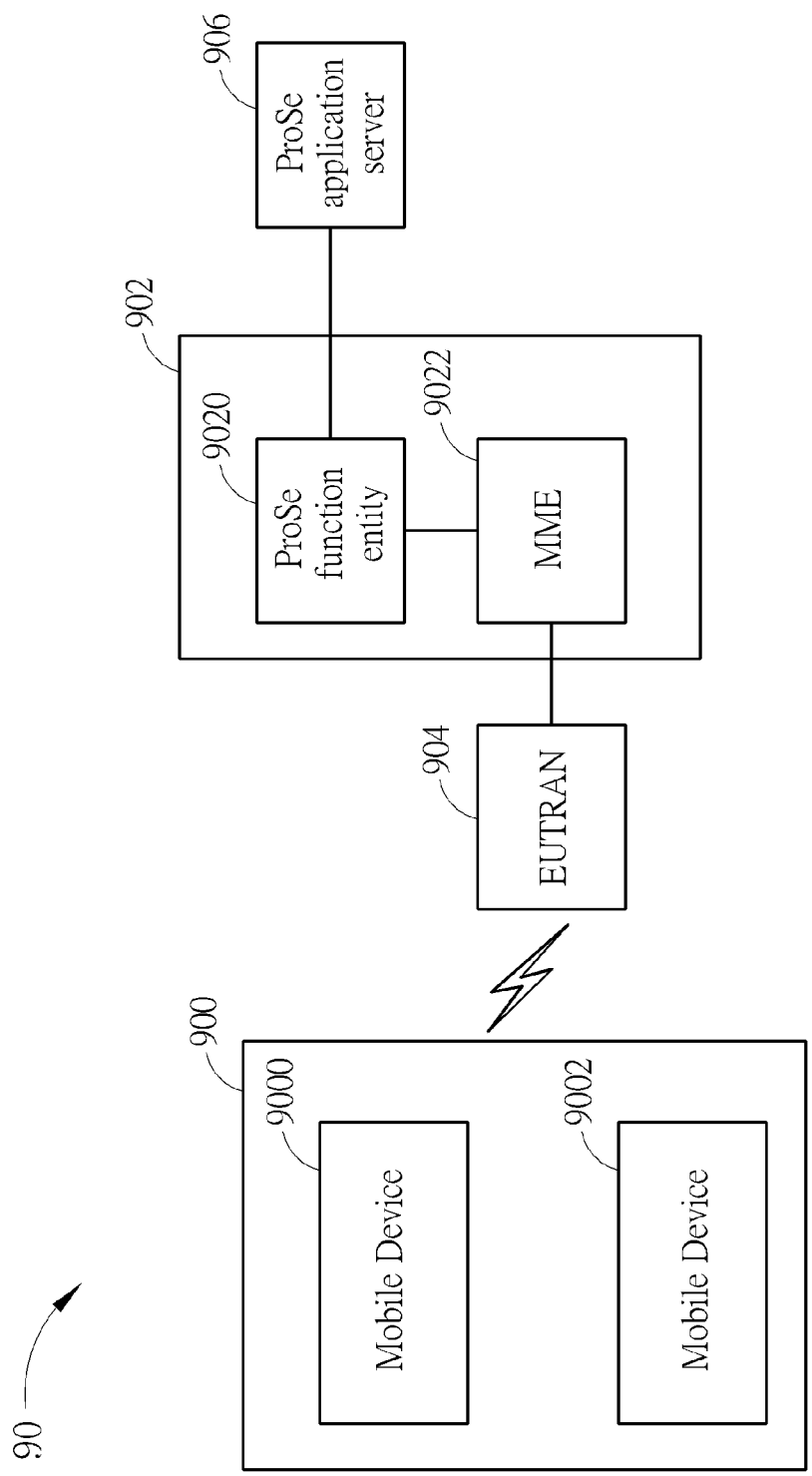
FIG. 9 is a schematic diagram of a wireless communication system according to an embodiment of the invention.

Please refer to FIG. 9, which is a schematic diagram of a wireless communication system 90 according to an embodiment of the invention. The wireless communication system 90 comprises at least one or more mobile devices 900, e.g. a source mobile device 9000 and a destination mobile device 9002, an access network 904 comprising one or more base stations, a core network 902 comprising network entities of a plurality of proximity service (ProSe) functions 9020 and a plurality of mobility management entities (MMEs) 9022, and a plurality of ProSe-enabled application servers 906 in Packet Data Network (PDN). Also the access network 904 can be EUTRAN containing a plurality of base stations (eNB) and the core network can be evolved packet core (EPC). For simplicity, FIG. 9 only shows one MME, one ProSe Function and one EUTRAN, which represents that a mobile device can register to one of the plurality of MMEs and one of the plurality of ProSe Functions within a EPC via one of the plurality of eNBs within a EUTRAN. In the embodiment, the source mobile device 9000 and the destination mobile device 9002 are both registered to the EPC 902 and ProSe-enabled Application server 906 for ProSe services. In particular the ProSe function 9020 within the EPC 902 and the ProSe application server 906 are utilized to handle ProSe features between the source mobile device 9000 and the destination mobile device 9002, wherein the ProSe features may be a ProSe discovery and/or a ProSe communication, which is not limited in the scope of the invention. That is, the ProSe discovery feature is for the discoverable ProSe-enabled mobile device (discoverer) to discover other nearby ProSe-enabled UEs (discoveree) and the ProSe communication is for the ProSe-enabled mobile devices in proximity to perform direct path communication, as known as device to device communication.

Noticeably, the mobile devices connect the application servers of the Packet Data Network, e.g. Internet, via EUTRAN and the EPC network, wherein the mobile devices, EUTRAN, and EPC are so called Evolved Packet System (EPS). That is, the EPS network containing EUTRAN and EPC provides connectivity of a Packet Data Network to mobile devices in EPS. Also, the EPC 902 of the invention, as well-known to those skilled in the art, may further comprise a home subscriber server (HSS), and/or a Packet Data Network Gateway (PGW), which is not limiting the scope of the invention. Specifically, the embodiment of the invention may also integrate one MME with the ProSe function 9020, which is not limiting the scope of the invention.

In other words, the embodiment of the invention teaches a method for handling ProSe discovery and ProSe communication, e.g. the source mobile device 9000 and the destination mobile device 9002 in the wireless communication system 90. For clear descriptions, the mobile device initiating/requesting the ProSe feature is called the source mobile device, and the mobile device being requested the ProSe feature is called the destination mobile device.

Certainly, the wireless communication system 90 of the invention may comprise more mobile devices for requesting or being requested the ProSe feature, i.e. those skilled in the art may be adaptively adjusted the number of the mobile device, such that any two of the mobile devices may adaptively initiate the ProSe feature, which is also in the scope of the invention.

Further, a computer system, not shown in FIG. 9, maybe coupled to the wireless communication system 90 of the invention, to process the method of handling device to device communication of the invention. In detail, the computer system may comprise a processing means such as a microprocessor or Application Specific Integrated Circuit (ASIC), a storage unit and a communication interfacing unit. The storage unit maybe any data storage device that can store a program code, accessed and executed by the processing means. Examples of the storage unit include but are not limited to read-only memory (ROM), flash memory, random-access memory (RAM), CD-ROM/DVD-ROM, magnetic tape, hard disk and optical data storage device. The communication interfacing unit is preferably a transceiver and is used to transmit and receive signals (e.g., messages or packets) according to processing results of the processing means. Accordingly, the wireless communication system 90 of the invention is operated under instructions of the computer system. Alternatively, the computer system may be cooperated with every composition elements of the wireless communication system 90, i.e. the program code may also be separately stored in every composition elements of the wireless communication system 90 to efficiently process the ProSe feature between the mobile devices 900, 904 and the EPS 902, which is also in the scope of the invention.

Figure 10:
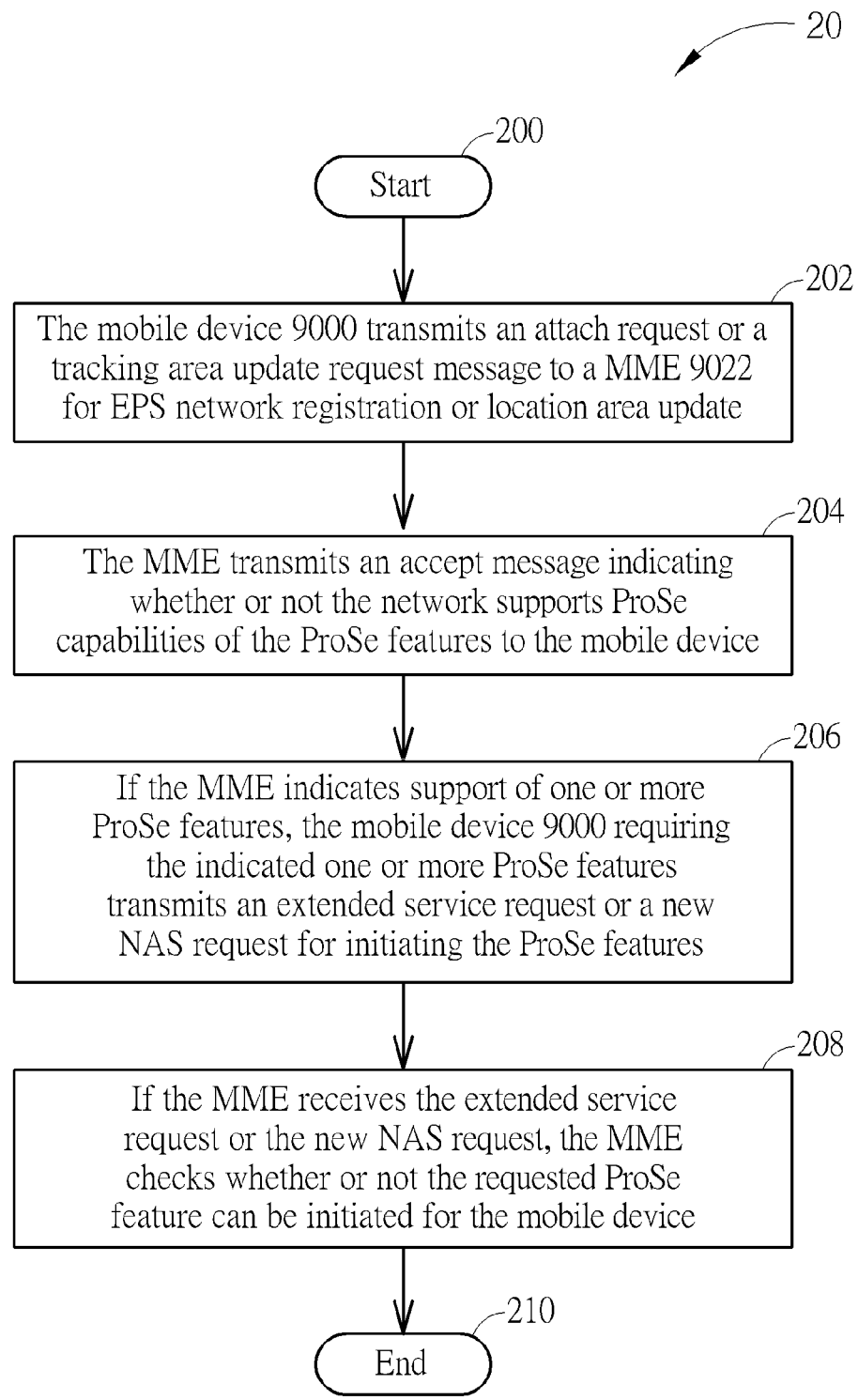
FIG. 10 to FIG. 14 are flow charts of processes for handling ProSe according to embodiments of the invention.

As mentioned above, the prior art has its restriction for realizing the ProSe communication. For example, the prior art fails to illustrate how an EPS determines the feasibility of the ProSe features for the UEs therein, or fails to teach whether all network entities in the EPS are able to support the one or more ProSe features. Accordingly, one embodiment of the invention is provided to solve the scenario. Please refer to FIG. 10, which illustrates a schematic diagram of a process 20 for handling proximity service (ProSe) according to an embodiment of the invention. As shown in FIG. 10, the process 20 may be compiled into another program code, stored in the computer system or related composition elements of the wireless communication system 90, and comprises, but not limited to, the following steps:

Step 200: Start.

Step 202: The mobile device 9000 transmits an attach request or a tracking area update request message to a MME 9022 for EPS network registration or location area update.

Step 204: The MME transmits an accept message indicating whether or not the network supports ProSe capabilities of the ProSe features to the mobile device.

Step 206: If the MME indicates support of one or more ProSe features, the mobile device 9000 requiring the indicated one or more ProSe features transmits an extended service request or a new NAS request for initiating the ProSe features.

Step 208: If the MME receives the extended service request or the new NAS request, the MME checks whether or not the requested ProSe feature can be initiated for the mobile device.

Step 210: End.

In step 202, the mobile device 9000 may transmit the attach request message or tracking area update message to the MME 9022 for EPS network registration or location area update. A ProSe-enabled UE also may indicate its ProSe-related network/radio capability in the UE network/radio capability IEs or a specific IE for ProSe in the attach request or TAU request message. Noticeably, the registered MME stores the indicated ProSe-related capability information obtaining from IEs of UE network capability, UE radio capability, and/or the specific IE for ProSe in MM context of the mobile device.

In step 204, if the EPS network supports the capability of one or more ProSe features, the MME indicates its ProSe capability in the attach accept message or tracking area update (TAU) accept message, such as an Evolved Packet System (EPS) network feature support information element (IE), in response to the attach request message or TAU request message from the mobile device 9000.

In step 206, if the EPS network supports one or more ProSe features, the mobile device 9000 requiring the one or more of the indicated ProSe features transmits an extended service request or a new NAS request to the MME 9022 for initiating the required one or more ProSe features.

In step 208, if the MME receives the extended service request or the new NAS request, the MME checks whether or not the requested ProSe feature can be initiated for the mobile device and then responds to the mobile device the results. In detail, the MME may check one or more of the following conditions: stored information of ProSe related network/radio capability indicated in the attach/TAU request message, requested ProSe features subscription of the mobile device 9000, and ProSe related parameters stored in mobility management (MM) context or a new ProSe context at the MME. Particularly, the ProSe related parameters in the embodiment may comprise discoverable preference, allowed discovery range, friend list, block list, memberships of the ProSe groups , authorized applications, allowable Public Land Mobile Network (PLMN) list.

Moreover, if the requested ProSe feature subscription of the mobile device 9000 is invalid, the stored UE/mobile device network/radio capability is not supported, or the one or more required ProSe related parameters are not supported, the MME rejects the NAS request for the ProSe feature from the mobile device via an NAS reject message indicating an Evolved Packet System (EPS) MM (EMM) cause. Particularly, the EMM cause of the embodiment may be the case, such as the ProSe feature being not allowed, a public land mobile network (PLMN) being not allowed, the ProSe feature being not allowed in a utilizing PLMN, or a requested ProSe feature not authorized in a utilizing PLMN.

On the other hand, if the MME accepts the NAS request of the mobile device 9000, the MME transmits ProSe related parameters to the base station, such that the base station may initiate the ProSe feature for the mobile device 9000 according to the ProSe related parameters to be indicated. Particularly, the ProSe related parameters of the embodiment is realized as one or more information elements in S1-C message over interface S1 between MME and the eNB. Alternatively, the MME may transmit another NAS accept message to the mobile device 9000 for initiating the ProSe feature if the MME accepts the ProSe feature requested by the mobile device 9000.

In short, the process 20 illustrates ProSe capability handling between the mobile device 9000 and the EPC 902 via one of the MMEs 9022 thereof. While the mobile device 9000 initiates the attach request for EPS registration or TAU request for location area update, the MME correspondingly responds to the mobile device 9000 with the accept message indicating the ProSe capability of the EPS network. Once the EPS network is capable of handling the one or more ProSe features, the mobile device 9000 requiring ProSe services transmits the extended service request or the new NAS request to the MME, such that the MME determines whether or not to accept the request based on stored information and then correspondingly initiates the ProSe feature if required conditions are all agreeable for providing the ProSe features.

Figure 11:
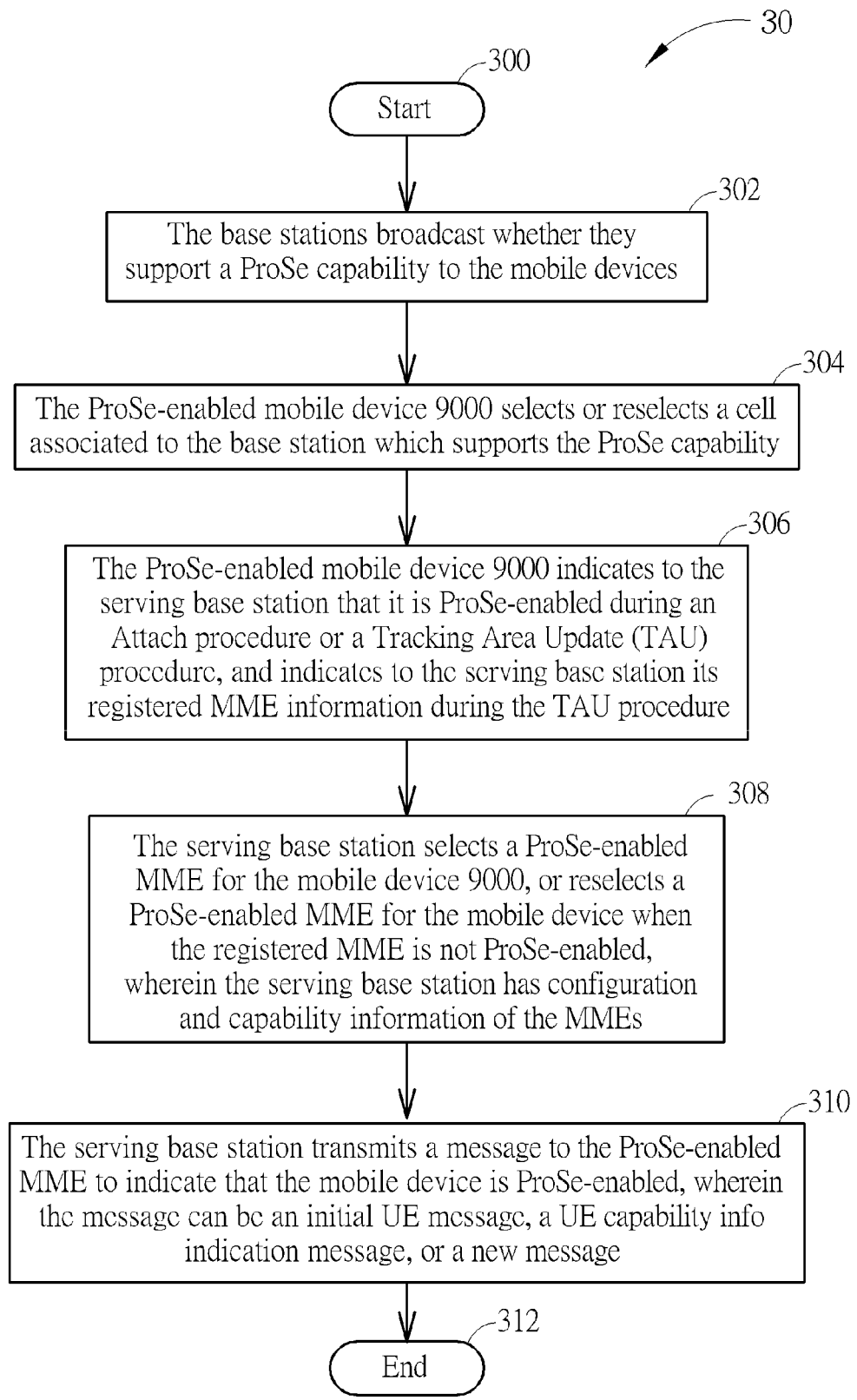

Please refer to FIG. 11, which illustrates a schematic diagram of a process 30 for handling proximity service (ProSe) according to an embodiment of the invention. As shown in FIG. 11, the process 30 may be compiled into another program code, stored in the computer system or related composition elements of the wireless communication system 90, and comprises, but not limited to, the following steps:

Step 300: Start.

Step 302: The base stations broadcast whether they support a ProSe capability to the mobile devices.

Step 304: The ProSe-enabled mobile device 9000 selects or reselects a cell associated to the base station which supports the ProSe capability.

Step 306: The ProSe-enabled mobile device 9000 indicates to the serving base station that it is ProSe-enabled during an Attach procedure or a Tracking Area Update (TAU) procedure, and indicates to the serving base station its registered MME information during the TAU procedure.

Step 308: The serving base station selects a ProSe-enabled MME for the mobile device 9000, or reselects a ProSe-enabled MME for the mobile device when the registered MME is not ProSe-enabled, wherein the serving base station has configuration and capability information of the MMEs.

Step 310: The serving base station transmits a message to the ProSe-enabled MME to indicate that the mobile device is ProSe-enabled, wherein the message can be an initial UE message, a UE capability info indication message, or a new message.

Step 312: End.

In step 302, the base station broadcasts its ProSe capability in a system information. With the received broadcast information, in step 304, the ProSe-enabled mobile device 9000 requiring ProSe service may then select or reselect a cell associated to the base station which supports the ProSe capability. In EPS, the cell information may be EUTRA cell, and the base station is eNB.

When camping on a EUTRA cell and the associated serving eNB is ProSe-enabled, in Step 306, the ProSe-enabled mobile device 9000 indicates to the serving base station that it is ProSe-enabled during an Attach procedure or a Tracking Area Update (TAU) procedure, and indicates to the serving base station its registered MME information during TAU procedure. To indicate the base station that the mobile device is ProSe-enabled, the mobile device 9000 may indicates that it is ProSe-enabled in a RRCConnection-SetupComplete message when establishing RRC connection procedure along with the attach procedure or tracking area update procedure.

Next, in Step 308, for a ProSe-enabled mobile device, the serving base station selects a ProSe-enabled MME for the mobile device 9000, or reselects a ProSe-enabled MME for the mobile device when the registered MME is not ProSe-enabled. Please note that the MMEs and the base stations normally stores configuration and capability information of the base stations and MMEs, respectively, because MMEs and base stations exchange such information when needed.

At last, in step 310, when selecting a ProSe-enabled MME as serving MME for the ProSe-enabled mobile device, the serving station transmits a message to the ProSe-enabled serving MME so as to inform the MME that the mobile device is ProSe-enabled. Please note that the message can be a new message for indicating ProSe-related information, an initial UE message, and an UE capability info indication message. After successfully attaching to a ProSe-enabled EPS network, the ProSe-enabled mobile device 9000 may request for the ProSe service by transmitting an extended service request or a new non-access stratum (NAS) request via the serving base station to a ProSe-enabled EPC network of the wireless communication system.

Figure 12:
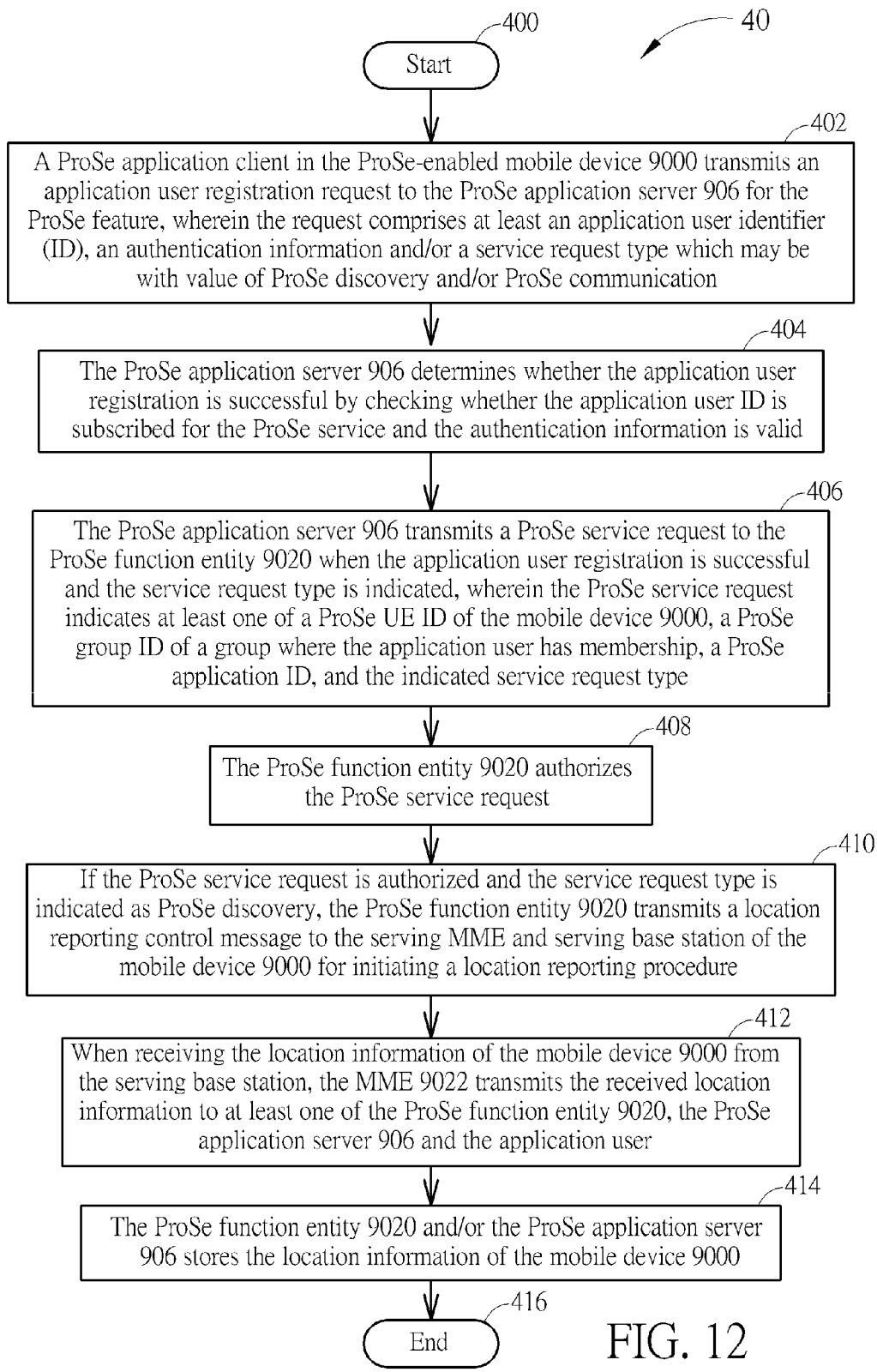

Further, the prior art fails to illustrate how a ProSe-enabled UE discovers an interested UE/group in the proximity and how a UE initiates the ProSe communication with another UE. Please refer to FIG. 12, which illustrates a schematic diagram of a process 40 for handling proximity service (ProSe) according to an embodiment of the invention. As shown in FIG. 12, the process 40 may be compiled into another program code, stored in the computer system or related composition elements of the wireless communication system 90, and comprises, but not limited to, the following steps:

Step 400: Start.

Step 402: A ProSe application client in the ProSe-enabled mobile device 9000 transmits an application user registration request to the ProSe application server 906 for the ProSe feature, wherein the request comprises at least an application user identifier (ID), an authentication information and/or a service request type which may be with value of ProSe discovery and/or ProSe communication.

Step 404: The ProSe application server 906 determines whether the application user registration is successful by checking whether the application user ID is subscribed for the ProSe service and the authentication information is valid.

Step 406: The ProSe application server 906 transmits a ProSe service request to the ProSe function entity 9020 when the application user registration is successful and the service request type is indicated, wherein the ProSe service request indicates at least one of a ProSe UE ID of the mobile device 9000, a ProSe group ID of a group where the application user has membership, a ProSe application ID, and the indicated service request type.

Step 408: The ProSe function entity 9020 authorizes the ProSe service request.

Step 410: If the ProSe service request is authorized and the service request type is indicated as ProSe discovery, the ProSe function entity 9020 transmits a location reporting control message to the serving MME and serving base station of the mobile device 9000 for initiating a location reporting procedure.

Step 412: When receiving the location information of the mobile device 9000 from the serving base station, the MME 9022 transmits the received location information to at least one of the ProSe function entity 9020, the ProSe application server 906 and the application user.

Step 414: The ProSe function entity 9020 and/or the ProSe application server 906 stores the location information of the mobile device 9000.

Step 416: End.

Before starting to use ProSe service, an application user needs to complete application user registration procedure. In Step 402, a ProSe application client in the ProSe-enabled mobile device 9000 transmits an application user registration request to the ProSe application server 906, wherein the request comprises at least an application user identifier (ID), an authentication information and/or a service request type which may be with value of ProSe discovery and/or ProSe communication. Please note that the service request type can be indicated as long with the application user registration procedure or a stand-alone procedure for indicated service. For example, after the application user registration, when the application user would like to start the ProSe service for ProSe discovery, it can indicate the service request type to the request message sending to the application server. In FIG. 12, it is assumed that the application user registration procedure also includes the ProSe service request if indicated.

Further, in Step 404, when receiving application user registration message, the ProSe application server 906 determines whether the application user registration is successful by checking whether the application user ID is subscribed for the ProSe service and the authentication information is valid.

If the service request type is also indicated, in step 406, the ProSe application server 906 transmits a ProSe service request indicating at least one of a ProSe UE ID of the mobile device 9000, a ProSe group ID of a group where the application user has membership, a ProSe application ID, and the indicated service request type to the ProSe function entity 9020 when the application user registration is successful. Please note that the ProSe UE ID is the identity with the information of a ProSe-enabled UE and the ProSe application.

Next, in Step 408, the ProSe function entity 9020 may authorize the mobile device for using the ProSe application and requesting the indicated ProSe service type, which can be done by the stored authorization information at ProSe function entity, e.g. authorized ProSe application ID, allowable ProSe service types, or retrieving from the HSS. Please note that the ProSe function entity may have to resolve the information of the ID of the mobile device, e.g. IMSI, and/or ID of the application, from the ProSe UE ID.

If the mobile device is authorized for the indicated ProSe service type and the service request type is indicated as ProSe discovery, in step 410, the ProSe function entity 9020 transmits a location reporting control message to the serving MME and serving base station of the mobile device 9000 for initiating a location reporting procedure. As soon as the location reporting procedure is initiated, the base station may report the latest location information, e.g. ECGI+TAI, of the mobile device to the serving MME immediately or update the location information when the location information is changed.

In Step 412, when receiving the location information of the mobile device 9000 from the serving base station, the MME 9022 transmits the received location information to at least one of the ProSe function entity 9020, the ProSe application server 906 and the application user. As such, in Step 414, the ProSe function entity 9020 and/or the ProSe application server 906 may store the location information of the mobile device 9000.

Figure 13:
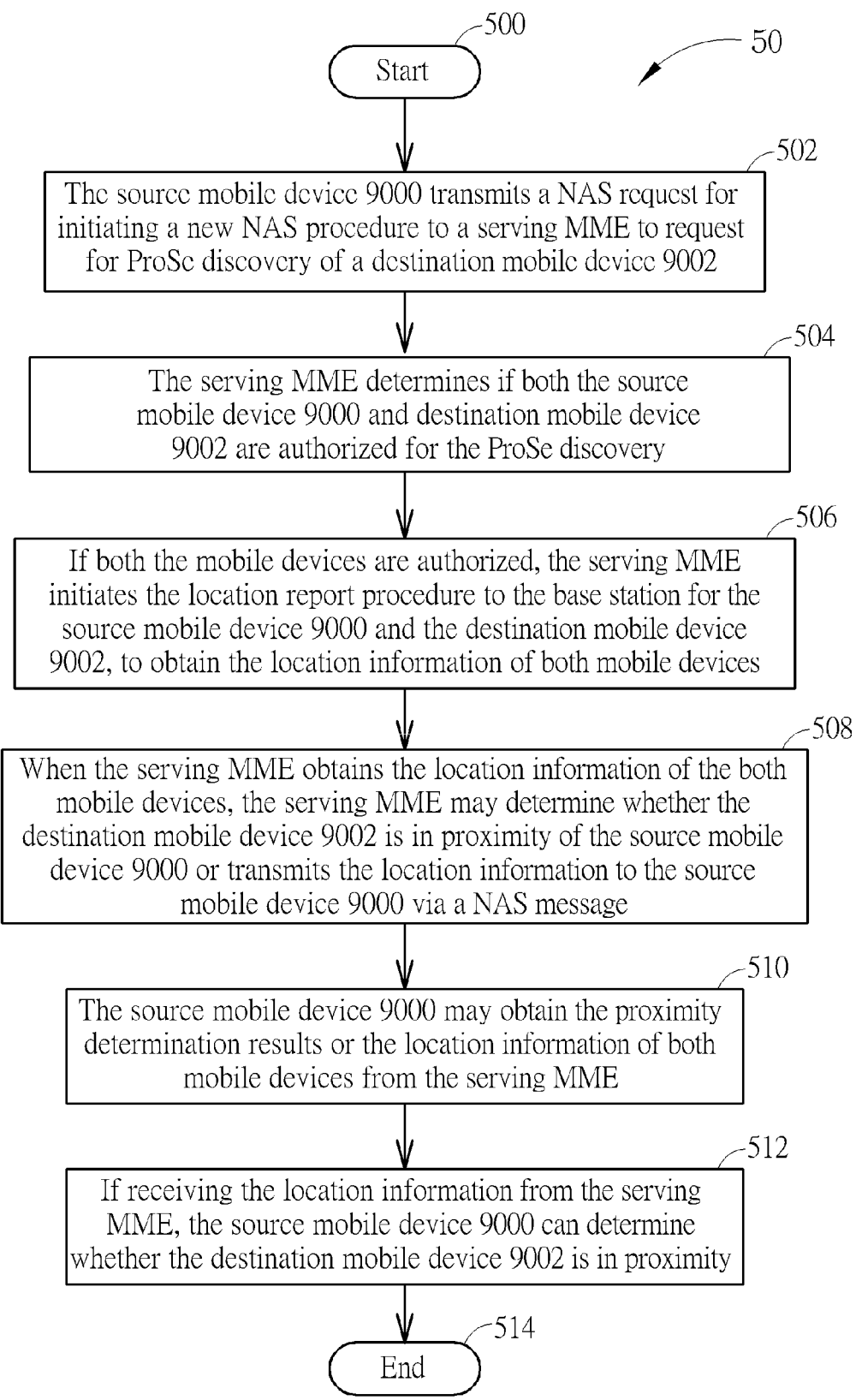

Please refer to FIG. 13, which illustrates a schematic diagram of a process 50 for handling proximity service (ProSe) according to an embodiment of the invention. As shown in FIG. 13, the process 50 may be compiled into another program code, stored in the computer system or related composition elements of the wireless communication system 90, and comprises, but not limited to, the following steps:

Step 500: Start.

Step 502: The source mobile device 9000 transmits a NAS request for initiating a new NAS procedure to a serving MME to request for ProSe discovery of a destination mobile device 9002.

Step 504: The serving MME determines if both the source mobile device 9000 and destination mobile device 9002 are authorized for the ProSe discovery.

Step 506: If both the mobile devices are authorized, the serving MME initiates the location report procedure to the base station for the source mobile device 9000 and the destination mobile device 9002, to obtain the location information of both mobile devices.

Step 508: When the serving MME obtains the location information of the both mobile devices, the serving MME may determine whether the destination mobile device 9002 is in proximity of the source mobile device 9000 or transmits the location information to the source mobile device 9000 via a NAS message.

Step 510: The source mobile device 9000 may obtain the proximity determination results or the location information of both mobile devices from the serving MME.

Step 512: If receiving the location information from the serving MME, the source mobile device 9000 can determine whether the destination mobile device 9002 is in proximity.

Step 514: End.

Please note that the serving MME in above process 50 is just an example, and can be replaced by another network entity, e.g. the ProSe function entity. In this case, the required information may further transfer from the serving MME to the ProSe function entity.

Before starting steps in FIG. 13, both source mobile device 9000 and destination mobile device 9002 transmit an application user request from a ProSe application client in a ProSe-enabled mobile device to a ProSe application server 906, wherein the request comprises at least an application user identifier and an authentication information. The ProSe application server 906 determines whether the application user registration is successful by checking whether the application user ID is subscribed for the ProSe service and the authentication information is valid. After successful application user registration, an authorization token may be returned to the application user as an application certificate to be used for activating ProSe features in lower layers.

In step 502, the source mobile device 9000 transmits a NAS request for initiating a new NAS procedure to a serving MME to request for ProSe discovery of a destination mobile device 9002. In the request message, the IDs of both the source mobile device 9000 and the destination mobile device 9002 are provided. The mobile device may be identified by a Mobile Station International Subscriber Directory Number (MSISDN) number, Globally Unique Temporary ID (GUTI), or a ProSe ID of the mobile device, wherein the ProSe ID is the identity of a ProSe-enabled mobile device used for uniquely identifying a ProSe-enabled mobile device in an EPC network. Particularly, the NAS message of the embodiment may be the extended service request or a new NAS request message for requesting ProSe discovery.

In step 504, the serving MME determines if both the source mobile device 9000 and destination mobile device 9002 are authorized for the ProSe discovery. Furthermore, in the configuration case that the ProSe discovery is supported only for mobile devices in the same serving MME, the serving MME checks whether mobility management (MM) context or a ProSe context for the destination mobile device 9002 exist or not. If exists, the serving MME can make sure that the source mobile device and the destination mobile device are served by the same MME. Based on operator policies, some criteria may be configured to restrict the granularities of the ProSe service within the same or different EPS network. As such the ProSe discovery may be authorized only when all the criteria are met.

In Step 506, if both the mobile devices are authorized, the serving MME initiates the location report procedure to the serving base stations for the source mobile device 9000 and the destination mobile device 9002, to obtain the location information of both mobile devices, wherein the location information may be, e.g. E-UTRAN Cell Global Identifier (ECGI) and Tracking Area Identifier (TAI).

In Step 508, when the serving MME obtains the location information of the both mobile devices, the serving MME may determine whether the destination mobile device 9002 is in proximity of the source mobile device 9000 or transmits the location information to the source mobile device 9000 via a NAS message. Particularly, the NAS message of the embodiment is realized as a downlink NAS transport message, an EPS Mobility Management (EMM) information message or a downlink generic NAS transport message. Besides, an additional IE may be utilized in the message to indicate the location information of the destination mobile device.

Next, as indicated in Step 510, the source mobile device 9000 may obtain the proximity determination results or the location information of both mobile devices from the serving MME from a NAS message. If receiving the location information from the serving MME, in Step 512, the source mobile device 9000 can determine whether the destination mobile device 9002 is in proximity.

In short, the device to device communication process 50 illustrates how the source mobile device 900 processes the ProSe discovery via the MME, such that the MME of the embodiment determines whether the destination mobile device 904 is in the proximity for the source mobile device 900. If the destination mobile device 904 is not proper for the source mobile device 900, the source mobile device 900 may process the ProSe discovery to find another optional mobile device in the wireless communication system 90, which is not limiting the scope of the invention. Certainly, the ProSe communication between the source mobile device 900 and the destination mobile device 904 may be processed after the ProSe discovery the authorization the destination mobile device 904 (or the other optional mobile devices) are both done, and more of the ProSe communication will be illustrated in the following paragraphs.

Figure 14:
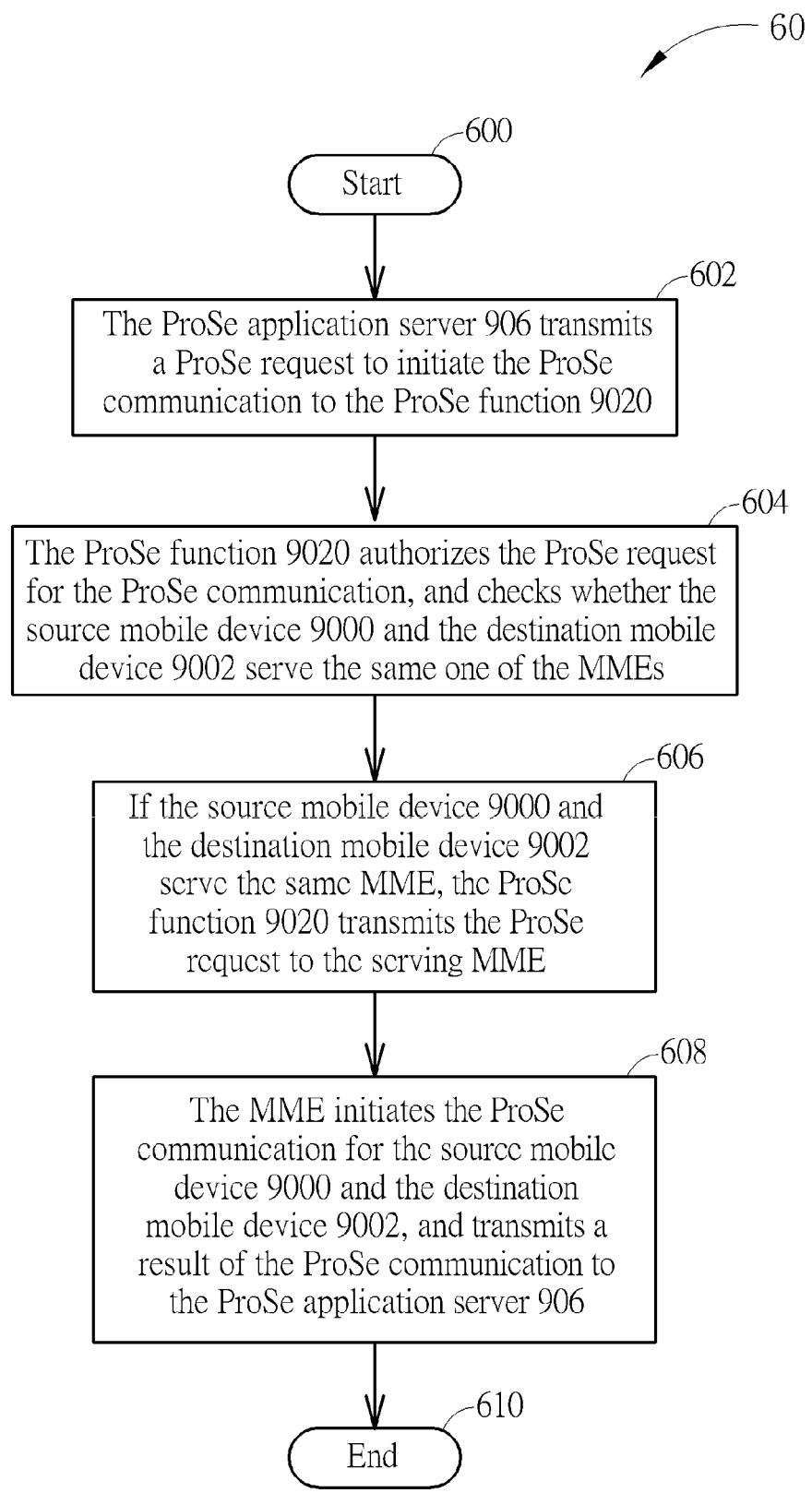

Please refer to FIG. 14, which illustrates a schematic diagram of a process 60 for handling proximity service (ProSe) according to an embodiment of the invention. As shown in FIG. 14, the process 60 may be compiled into another program code, stored in the computer system or related composition elements of the wireless communication system 90, and comprises, but not limited to, the following steps:

Step 600: Start.

Step 602: The ProSe application server 906 transmits a ProSe request to initiate the ProSe communication to the ProSe function 9020.

Step 604: The ProSe function 9020 authorizes the ProSe request for the ProSe communication, and checks whether the source mobile device 9000 and the destination mobile device 9002 serve the same one of the MMEs.

Step 606: If the source mobile device 9000 and the destination mobile device 9002 serve the same MME, the ProSe function 9020 transmits the ProSe request to the serving MME.

Step 608: The MME initiates the ProSe communication for the source mobile device 9000 and the destination mobile device 9002, and transmits a result of the ProSe communication to the ProSe application server 906.

Step 610: End.

In step 602, the ProSe application server 906 transmits the ProSe request to initiate the ProSe communication to the ProSe function 9020. Particularly, the ProSe request of the embodiment indicates a ProSe communication pair by utilizing respective application user IDs or ProSe UE IDs of the mobile devices, and the ProSe communication is processed after processing/completing the ProSe discovery to determine the proximity between the source mobile device 9000 and the destination mobile device 9002.

In step 604, the ProSe function 9020 authorizes the ProSe request for the ProSe communication, and checks whether the source mobile device 9000 and the destination mobile device 9002 is served by the same MME.

In step 606, if the source mobile device 9000 and the destination mobile device 9002 are served by the same MME, the ProSe function 9020 transmits the ProSe request to the serving MME.

In step 608, the MME initiates the ProSe communication for the source mobile device 9000 and the destination mobile device 9002, and transmits the result of the ProSe communication to the ProSe application server 906.

In detail, the operations of the MME initiating the ProSe communication for the source mobile device 9000 and the destination mobile device 9002 can be understood in the following descriptions. The MME of the embodiment may initiate a paging message to the source mobile device 9000 and the destination mobile device 9002, wherein the paging message indicates ProSe communication flags and ProSe UE IDs of the source mobile device and the destination mobile device. Next, in response to the received paging message, the source mobile device 9000 and the destination mobile device 9002 may transmit the extended service requests and/or Packet Data Network (PDN) connectivity request messages to the serving MME, wherein the extended service requests or the PDN connectivity request messages indicating request type IE as ProSe communication, which is used for indicating the MME that the mobile device requests a connectivity to a PDN providing ProSe features. The source mobile device 9000 may determine to initiate ProSe communication and may initiate the extended service request or the new NAS request indicating ProSe UE ID of the destination mobile device 9004 to be communicated with. The MME receiving the NAS request from the source mobile device 9000 for initiating ProSe communication may transmit the paging message to the destination mobile device 9002 by indicating the ProSe communication flag and ProSe UE ID of the mobile device 9002. While receiving the paging message, the destination mobile device may transmit the extended service request to the MME for confirmation. Accordingly, the source mobile device 9000 and the destination mobile device 9002 may transmit a PDN connectivity request message to the MME, wherein the PDN connectivity request message indicates a request type as the ProSe communication and the ProSe UE ID of the mobile device to be communicated by ProSe.

Moreover, while receiving the PDN connectivity request message indicating for ProSe communication, the MME setups a ProSe PDN connection towards a Packet Data Network Gateway (PGW) associated to a ProSe APN, such that the PGW may allocate Internet Protocol (IP) addresses for the source mobile device 9000 and the destination mobile device 9002 to register the source mobile device 9000 and the destination mobile device 9002 to the ProSe function 9020, wherein the PGW and ProSe function maybe collocated, i.e. the ProSe function is a ProSe-enabled PGW. Next, the ProSe function 9020 registers the source mobile device 9000 and the destination mobile device 9002 to the HSS by their IP addresses or correlation IDs of the ProSe PDN connections, wherein the correlation IDs is generated by the ProSe function 9020, to correlate the ProSe UE ID of the mobile device and the IP address for the ProSe communication. Accordingly, the ProSe function 9020 informs the MME to transmit two individual PDN Connectivity accept message via the base station to the source mobile device 9000 and the destination mobile device 9002, respectively.

In the embodiment, while processing the ProSe communication, a Tunnel Endpoint Identification (TEID) in the Serving PGW used for a user plane and the address of the Serving PGW for the user plane are not needed. Instead, the S1_MME control message of the embodiment may comprise a correlation ID for enabling the ProSe communication via the user plane path or a local routed user plane path in the base station, and the correlation ID is generated by the eNB to correlate the ProSe PDN connections of the source mobile device 9000 and the destination mobile device 9002 for ProSe communication.

In short, the process 60 instructs the ProSe communication between the ProSe application server 906, the ProSe function entity 9020, the MME and the source mobile device 9000 after the ProSe discovery is completed with proper confirmation for continuing to initiate the ProSe communication.

Noticeably, the number of the source/destination mobile device, the MME and base station are not limiting in the embodiments, and the connection relationship between the base station, the MME, the ProSe function 9020 and the ProSe application server 906 can be adaptively amended to providing the proper transmission.

Also, the processes 20-60 can be adaptively cooperated with each other. Under such circumstances, before the source mobile device 9000 initiates the request of the ProSe feature, the EPS 902 may broadcast its ProSe capability to inform the source mobile device 900 and the destination mobile device 904 (and other mobile devices existing in the wireless communication system 90). If the enabling of the ProSe feature of the composition devices, such as the base station and the MME, of the EPS 902 are confirmed, the ProSe discovery initiated from the source mobile device 900 may be processed to retrieve the location information of the destination mobile device 904 for the source mobile device 900, so as to determine whether the destination mobile device 904 is in the proximity from the source mobile device 900. Accordingly, the ProSe communication may be initiated by the source mobile device 900 to the destination mobile device 904 via the ProSe function 9020 and/or the ProSe application server 906 of the EPS 902.

Figure 15:
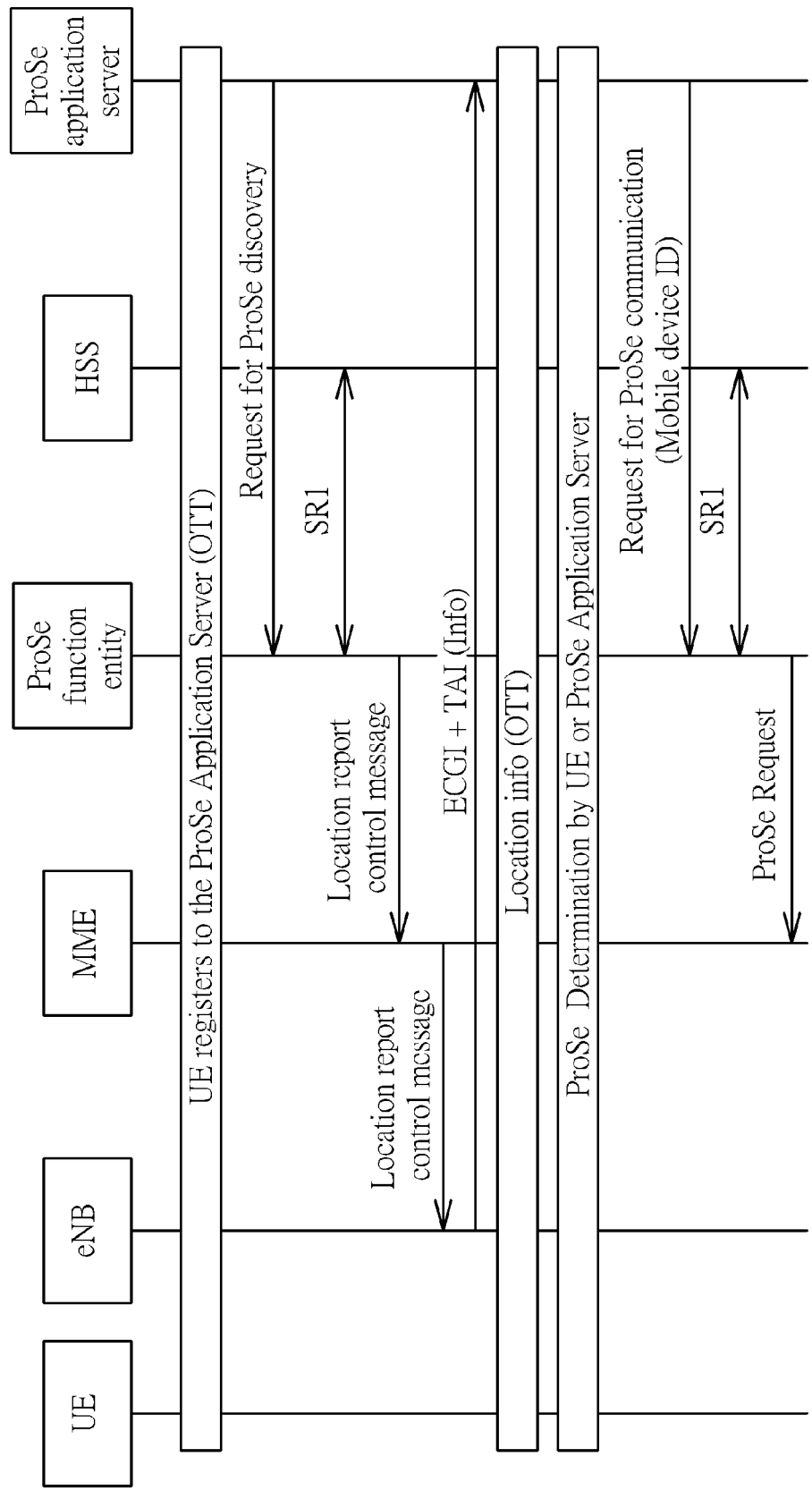
FIG. 15 is a schematic diagram of processing the ProSe feature from the source mobile device according to an embodiment of the invention.

One practical embodiment of the source mobile device 900 for initiating the ProSe feature (comprising the ProSe discovery and the ProSe communication) may be seen in FIG. 15. More descriptions of the embodiment shown in FIG. 15 can be obtained via the device to device communication processes 30 and 50, and is not described hereinafter.

Also, those skilled in the art should adaptively make combinations, modifications and/or alterations on the abovementioned embodiment. The abovementioned steps of the processes 20-60 comprising suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), the communication device in the wireless communication system 10 of the invention.

In conclusion, the embodiment of the invention provides a method of handling the device to device communication via the ProSe function as well as the ProSe application server, such that more descriptions for properly processing the ProSe feature in the wireless communication system can obtain to extend/enlarge the application range of the mobile devices and the wireless communication system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling proximity service (ProSe) in a wireless communication system, comprising: receiving, by a network entity of the wireless communication system, an attach request message or tracking area update (TAU) request message from a mobile device of the wireless communication system: transmitting, by the network entity, an attach accept message or TAU accept message indicating to the mobile device whether the network entity supports a ProSe capability of one or more ProSe features in an attach TAU receiving, by the network entity, a first request message for initiating at least one of the one or more ProSe features from the mobile device requiring the at least one of the one or more ProSe features, when the network entity indicates support of the one or more ProSe features; and determining, bt the network entity, whether to accept the first request message by checking whether or not the at least one of the one or more ProSe features can be initiated for the mobile device.

2. The method of claim 1, wherein the network entity indicates whether the network entity supports the ProSe capability in a network feature support information element (IE) or a new IE of the attach accept message or the TAU accept message.

3. The method of claim 1,
   wherein the mobile device is ProSe-enabled and the first request message is an extended service request or a new request.

4. The method of claim 1, wherein the determining step comprises:
   checking at least one of a UE network capability IE, a UE radio capability IE, a ProSe service subscription of the mobile device, and ProSe related parameters stored in a mobility management entity (MME) mobility management (MM) context or a ProSe context;
   wherein the UE network capability IE and the UE radio capability IE are included in the attach request message or the TAU request message.

5. The method of claim 4, further comprising:
   rejecting, by the network entity, the first request message when the ProSe service subscription of the mobile device is invalid or the ProSe related parameters are not supported by the network entity.

6. The method of claim 4, further comprising:
   transmitting, by the network entity, the ProSe related parameters to a base station of the wireless communication system for starting the ProSe communication, when the network entity accepts the first request message.

7. The method of claim 4, further comprising:
   transmitting, by the network entity, a second message to the mobile device for indicating that the network entity accepts the first request message.

* * * * *